Oct. 22, 1963   P. SMITH   3,107,664
MEDICAL TRANSDUCER FOR DETECTING ARTERIAL PULSATIONS
Filed Aug. 18, 1961   2 Sheets-Sheet 1
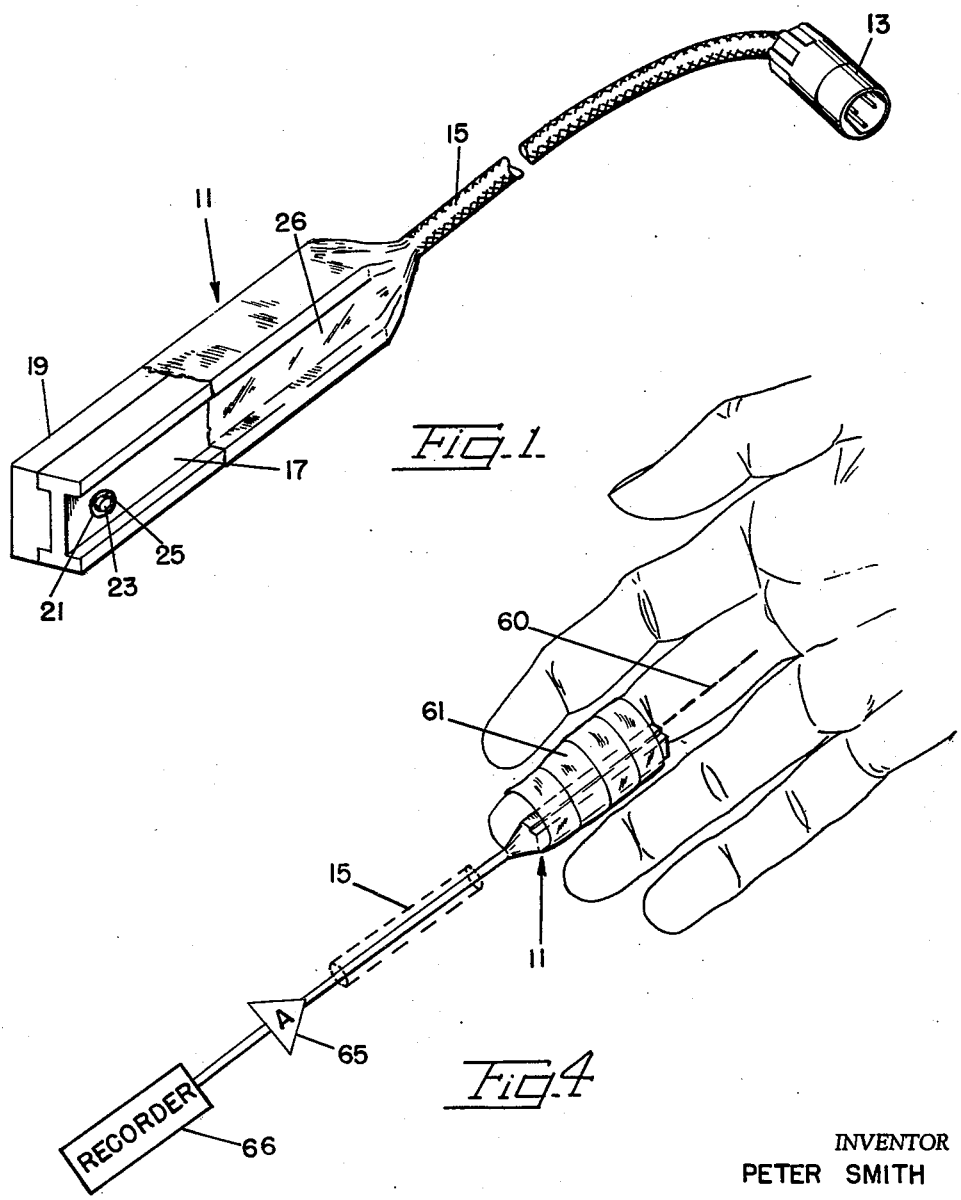
*INVENTOR*
PETER SMITH

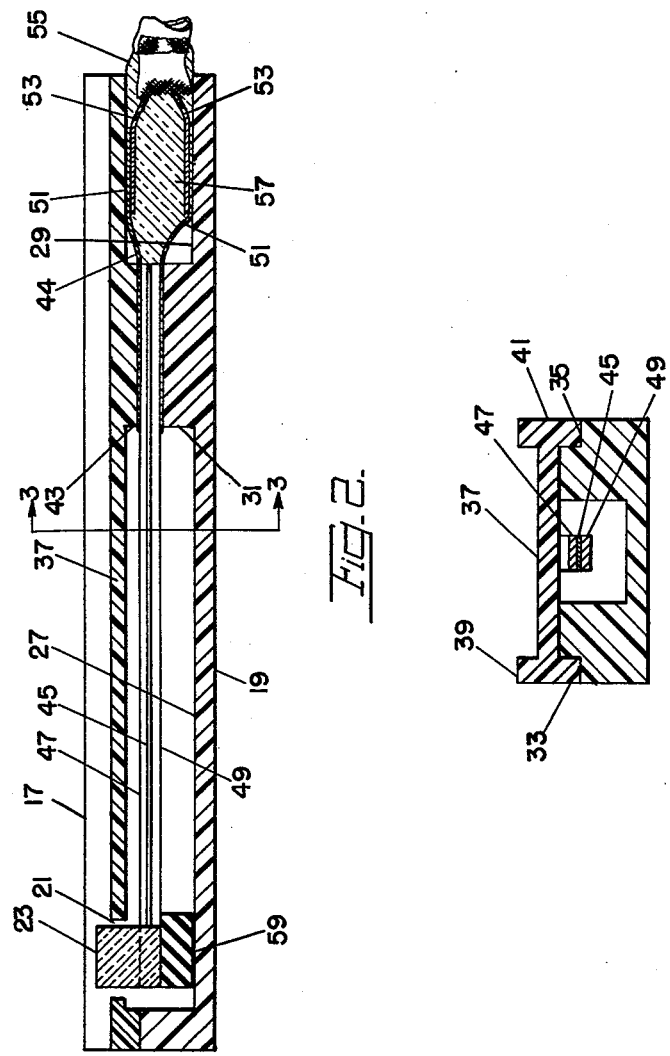

United States Patent Office 3,107,664
Patented Oct. 22, 1963

3,107,664
MEDICAL TRANSDUCER FOR DETECTING ARTERIAL PULSATIONS
Peter Smith, Glendola, N.J., assignor to Dynamics Corporation of America, New York, N.Y., a corporation of New York
Filed Aug. 18, 1961, Ser. No. 132,354
8 Claims. (Cl. 128—2.05)

This invention relates to a transducing device and more particularly to an improvement in transducing devices for detecting arterial pulsations in the form of generated electrical signals.

Two of the primary problems encountered in the use of electromechanical transducers are extraneous signals produced as a result of exterior electromagnetic effects and extraneous mechanical forces acting upon the transducing other than the forces which are to be detected. The latter extraneous effects are commonly known as artifact.

In the field of arterial pulse detection wherein electromechanical transducers are used, artifact is a common and as yet unsolved problem encountered in all such devices in use today. Whether the detection be through use of the transducing element on a limb or digit over the pulsating artery, any movement by the patient has been found to produce an unwanted pressure effect on the transducing element which causes an additional unwanted signal to be induced in the transducer, thus giving an inaccurate or false reading. Since it is extremely difficult for any person to remain absolutely still during the detection process, it becomes apparent that reduction of artifact, as a practical matter, must be accomplished through improvement of the transducing elements used in such detection.

The transducer of the present invention is intended for use in detection of arterial pulsations in a digit and further is intended for use with a blood pressure follower system using the arterial pulsations. Such a system is shown and described in copending patent application Serial No. 58,115 filed September 23, 1960, in the name of John H. Green and assigned to the assignee of the present invention. It will be obvious to one skilled in the art that reduction of artifact inherent in such a system will greatly enhance the accuracy of the final output of the system.

When an electromechanical transducer is used for detection of arterial pulsations, the equipment used therewith, such as amplifying devices and other electronic machinery, produces stray electromagnetic fields which also affect the final signal output of the transducer. Such signals further add to the inaccuracy of the final results.

Accordingly, it is an object of this invention to provide a transducer for converting arterial pulsations into corresponding electrical signals.

A further object of this invention is to provide a transducer for detecting arterial pulsations which reduces artifact to a minimum.

Another object of this invention is to provide a transducer having a housing shaped on one side thereof so as to conform to a digit of the human body.

Yet another object of this invention is to provide a transducer including means for preventing damage and undue strain to the transducing element therein.

A further object of this invention is to provide a transducer which is shielded from exterior electromagnetic interferences.

A still further object of this invention is to provide a simplified transducer which is relatively simple and economical to manufacture.

Further objects and advantages of this invention will become apparent to those skilled in the art by referring to the following description when taken in conjunction with the accompanying drawings in which:

FIG. 1 is a perspective view of the completed transducer element and electrical leads thereto;

FIG. 2 is a sectional plan view taken through the length of the transducing element;

FIG. 3 is a sectional end view taken through the lines 3—3 of FIG. 2; and

FIG. 4 is a schematic presentation of the transducer and associated signal producing equipment in actual use in connection with a digit of the patient.

Turning now more specifically to the drawings, FIG. 1 shows the basic transducer including housing 11 and a three-pronged plug 13 connected thereto by means of a cable 15. One face of the housing 11 has a channel 17 therein and comprises, according to the preferred construction techniques, the outer face of the upper section of the housing 11. This upper section of the housing is mated with a lower section 19 as will become apparent as the description proceeds. Both the upper and lower sections of the housing are comprised of a dielectric material such as an epoxy resin.

An aperture 21 is formed in the channel 17 in order to provide access for a button 23 which extends from the inner part of the basic housing upwardly through the channel 17. This button 23 is secured to one end of the basic piezoelectric element 25 within housing 11. The entire housing is covered by a shielding means 26 such as aluminum foil which provides an electromagnetic shield for preventing extraneous electromagnetic radiation from interfering with the signal generated within the piezoelectric element 25 when in operation.

Turning now to FIGS. 2 and 3, which show the housing 11 in detail, it may be seen that the lower section 19 of the housing is formed so as to have two recesses 27 and 29 therein and, additionally, has two grooves 33 and 35 in the upper outer edges thereof. Thus, there exists in the lower section a separating wall member 31 between the two recesses formed. The channel 17 of the housing has a configuration similar to that of an I beam with the central section 37 integral with the two vertically extending legs 39 and 41. These vertically extending legs are formed so as to fit within the grooves 33 and 35 of the lower section 19 of the housing. The channel 17 also has a depending extension 43 which is located above wall member 31 of the lower section 19. Accordingly, when the upper section including channel 17 is placed on the lower section 19 and secured thereto through the use of an appropriate cement or sealing compound, the two sections combine to form a housing having a first or forward compartment and a second or rearward compartment.

The wall member 31 and the depending extension are grooved so as to receive the piezoelectric element 25 therebetween. Thus, the wall member and the depending extension are formed in a manner such that they will grip the piezoelectric element 25 therebetween when these sections are secured together.

The piezoelectric element 25 is a standard bimorph crystal which consists essentially of two thin strips of ceramic 47 and 49 between which is placed a thin strip of metal. The metal strip 45 serves to connect the electrodes formed by the two strips of ceramic. These two strips of ceramic are then artificially polarized in the same direction and a piezoelectric element is created which, when deformed, will generate therein an electric signal according to the now well known piezoelectric principles.

The free end of the piezoelectric element has affixed thereto a dielectric button 23 composed of a suitable material such as an epoxy resin. This button 23 extends through the central section 37 of the channel 17 of the housing. Accordingly, it can be seen that, unlike previous transducers used for detecting arterial pulsations, the only force upon the piezoelectric element 25 which will create an electrical signal therein is produced by depression of the button 23, since the remaining part of the piezoelectric element is protected from exterior effects. This construction, in itself, greatly reduces previously encountered artifact due to the fact that the remaining pulp portion of the digit is not bearing against the actual piezoelectric element and therefore any movement therein cannot have any effect upon this element.

In order to further reduce any possible effect due to artifact, bumper 59 of resilient material such as soft pliable rubber is secured to the lower section 19 by means of a suitable cement to create a reactive support member for the piezoelectric element. This bumper serves a number of useful and significant purposes. Primarily, since the bumper is in contact with and supports the piezoelectric element, the force necessary to depress the button 23 is greater than that which would be required if the end of the element were left in a position so as to be free within the compartment created by the housing. Accordingly, the bumper 59 creates, in effect, a damping device which prevents slight movements of the digit from effecting a distortion of the piezoelectric element. This produces the effect of a gate in that it allows only forces of a predetermined or definite amplitude to distort the element and prevents forces less than this predetermined amplitude from effecting any distortion of the element. Additionally, the bumper 59 serves as a protective element in that a force of large magnitude exerted on the button 23 is prevented from damaging the piezoelectric element 25. Another advantage obtained through the use of bumper 49 is the provision of a support for the piezoelectric element 25, thereby preventing sagging of the crystal which, over a period of time, could reduce the efficiency of the crystal and even damage it to a degree such that it would not give an effective reading.

In order to transmit the signals generated within the piezoelectric element 25, foil leads 43 are soldered to each ceramic strip and passed through the wall portion created by the extensions 31 and 43. The foil leads pass into the second compartment formed by the upper and lower sections. The second compartment is open at the outer end and the shielded cable passes therein with the two electrical leads 53 being connected to the thin foil leads 43 within this compartment. The shielding around the cable acts as the ground lead for the signal circuit system. The entire second compartment is then filled with epoxy resin to provide appropriate insulation and support to the various leads and to secure the cable within the compartment.

FIG. 4 is an illustration of the housing 11 mounted against a digit of a patient. The main artery 60 extends outwardly towards the end of the digit and is covered by the channel 17 which is located in a manner such that the button 23 is directly adjacent to the digit and over the artery 60. Accordingly, every pulsation within the artery depresses the button 23 and mechanically distorts the piezoelectric element 25 whereby the signal generated by the crystal is transmitted by the foil leads and the shielded cable 15, amplified by a suitable amplifier 65 and actuates a suitable indicating device such as a recorder 66.

As discussed hereinabove, due to the fact that this type of apparatus is inherently used around electrical equipment and in areas wherein electromagnetic radiations are predominant, a further method of enhancing the accuracy of the device is to provide a means for shielding the housing and the associated circuitry from the influence of these electromagnetic effects. Accordingly, the housing is covered with a shielding means such as aluminum foil and the cable itself is shielded so as to avoid any effects on the leads within the cable.

When the transducer of the present invention is used, the housing 11 is placed on a digit so that the channel 17 is located adjacent the pulp of the finger with the button directly over the main artery of the digit. The housing is then held securely in place by means such as tape 61 or the like. The tape is applied in a manner that it will not occlude the finger or restrict circulation in any manner. Therefore, each arterial pulsation in the digit will actuate the button and mechanically distort the piezoelectric element. The distortion of this element produces an electrical output which is amplified and delivered to a visual indicator such as recorder 66, indicating the pulse rate as well as the presence of a pulse in the patient.

It is to be understood that this invention may take various forms and that the particular configuration as shown herein is illustrative only and is not to be considered as a limitation on the scope of the invention.

I claim:

1. A device for detecting arterial pulsations comprising an elongated dielectric housing substantially rectangular in cross-section, a channel in the upper face of said housing extending along the length theref, a compartment within said housing, an elongated piezoelectric means supported at one end by said housing and extending within said compartment, a dielectric button secured to the free end of said piezoelectric means, said button extending upwardly through said channel, a resilient dielectric bumper secured to the base of said compartment below said button in contacting and reactive supporting relation thereto to said transducing means, and circuit means connected to said piezoelectric means and extending outwardly from said housing for receiving the electrical signal generated by depression of said button.

2. The apparatus of claim 1 further comprising means for shielding said device from exterior electromagnetic energy.

3. A device for detecting arterial pulsations comprising a hollow elongated dielectric housing, a channel in one outer face of said housing and extending the length thereof, an elongated piezoelectric element mounted at one end within said housing, a button secured to the free end of said piezoelectric element and extending through said housing and into said channel, a resilient dielectric pad mounted within said housing below said button in contacting and reactive supporting relation thereto, and electrical leads secured to said piezoelectric element and extending outwardly of said housing.

4. The apparatus of claim 3 further comprising an electromagnetic shield encompassing said dielectric housing, said button extending through said shield.

5. A device for detecting arterial pulsations comprising an elongated dielectric housing substantially rectangular in cross-section, first and second compartments within said housing, a vertical wall separating said compartments, an elongated piezoelectric element supported at one end within said wall and extending into said first compartment, a button secured to the free end of said piezoelectric element and extending through one of the outer faces of said housing, a cable having leads therein extending through said housing and into said second compartment, and conductive means connecting said leads to said piezoelectric element through said wall.

6. The apparatus of claim 5 further comprising a channel in said one of the outer faces of said housing.

7. The apparatus of claim 5 further comprising an electromagnetic shield surrounding said dielectric housing.

8. The apparatus of claim 7 further comprising a resilient pad secured within said first compartment below said button, said resilient pad supporting the free end of said piezoelectric element.

References Cited in the file of this patent

UNITED STATES PATENTS

| | | |
|---|---|---|
| 2,658,505 | Sheer | Nov. 10, 1953 |
| 2,702,354 | Chorpening | Feb. 15, 1955 |
| 2,826,191 | Burns | Mar. 11, 1958 |
| 2,875,750 | Boucke | Mar. 3, 1959 |